Feb. 2, 1965    C. FARMER    3,167,853
METHOD OF WINDING ARMATURE CORES DIRECTLY FROM SPOOLED SUPPLIES
Filed Dec. 30, 1960    2 Sheets-Sheet 2
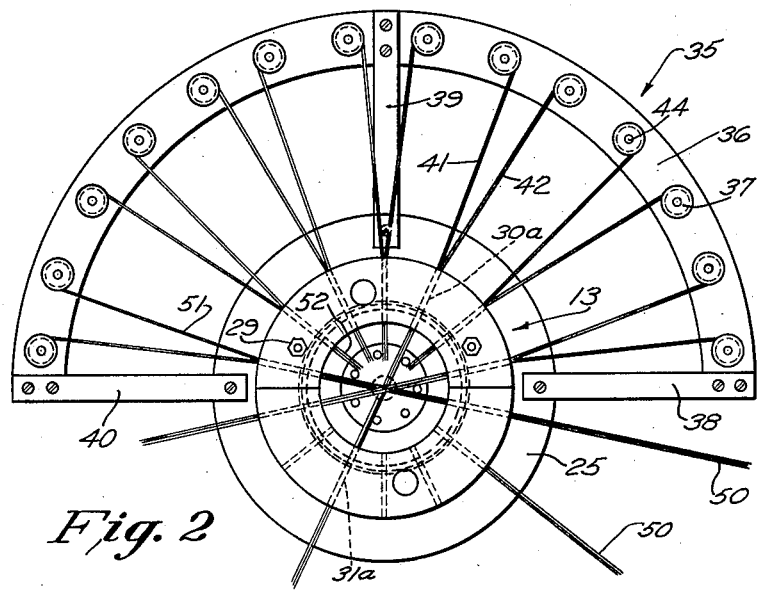
Fig. 2
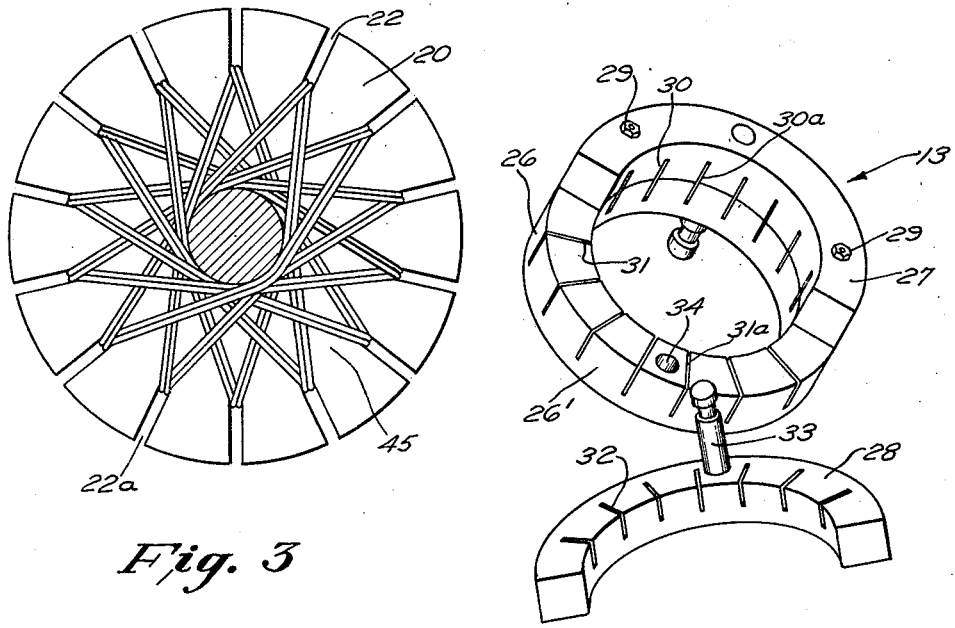
Fig. 3
Fig. 4
INVENTOR.
Cecil Farmer
BY
Barlow & Barlow
ATTORNEYS

United States Patent Office 3,167,853
Patented Feb. 2, 1965

3,167,853
METHOD OF WINDING ARMATURE CORES DIRECTLY FROM SPOOLED SUPPLIES
Cecil Farmer, 12 Elm St., Pawtucket, R.I.
Filed Dec. 30, 1960, Ser. No. 79,855
3 Claims. (Cl. 29—155.57)

This invention relates to a method for winding coils in the grooves of an armature core of an electric generator or motor and an apparatus particularly adapted to carry out the method.

Heretofore armature cores have been wound in a manner such as shown in my prior Patent 2,875,508 or 2,876,449, both dated March 3, 1959, in a manner which required the severing of the wire to be wound from some supply source to provide a length substantially the length of the coil to be wound or a multiple thereof if two coils were to be wound from the same wire at the same time. Such a step required certain preparation for the winding of the armature core.

An object of this invention is a method of winding an armature core so that there need be no preliminary severing from the source of supply of the wires to be wound in coils about the armature core, rather the wire may be taken directly from spools on which it is packaged and severed only after the core has been completely wound.

Another object of this invention is to provide in a simple machine, such as one which is hand-operated, an arrangement by which such a method may be carried out.

Another object of the invention is to provide, in an apparatus for accomplishing the above method, a guide for the wires to be wound which will need threading of the wires through openings by passing the end of the wire through the opening but which will be of such a construction that the wires which are threaded through the guide need not be re-threaded in the guide after completion of winding of the armature but will remain threaded in the guide for use in winding the succeeding armature after one armature is wound and the wires are severed.

With these and other objects in view the invention consists of certain novel features of construction as will be more fully described and particularly pointed out in the appended claims.

In the accompanying drawings:

FIG. 2 is a top plan view thereof somewhat schematic with parts omitted away for clearance;

FIG. 3 is a bottom view of an armature which has been partially wound; and

FIG. 4 is an exploded perspective view showing the two parts of the guide member which is employed in this apparatus.

Figure 1:
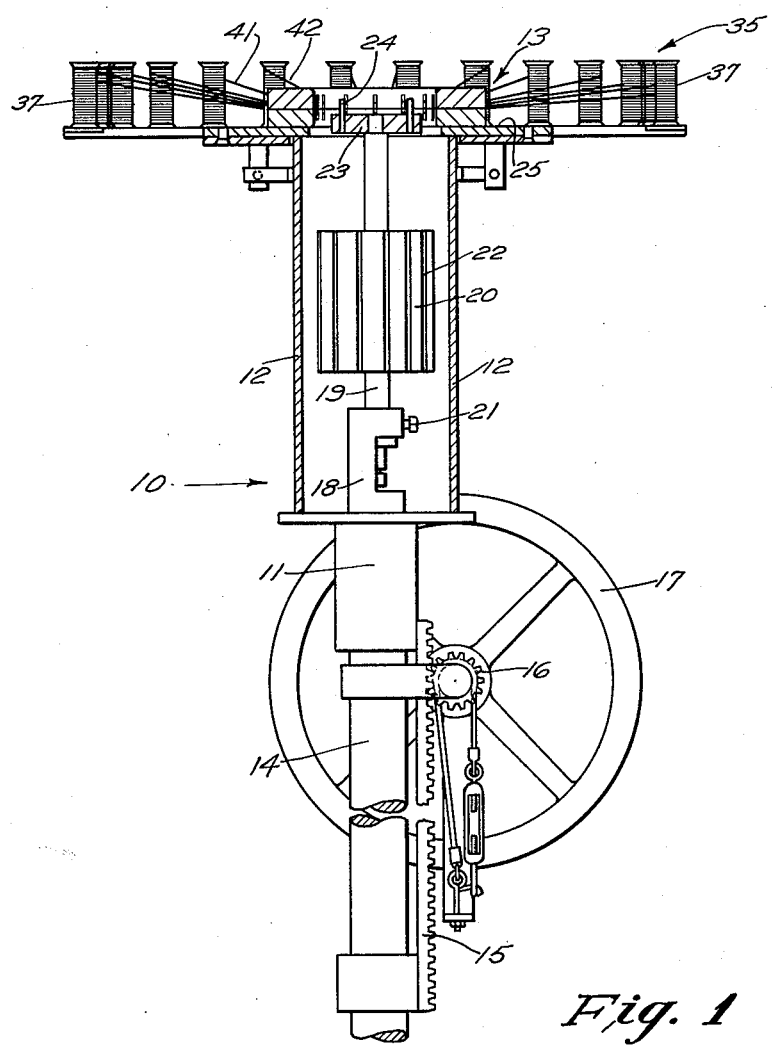
FIG. 1 is an elevational view partly in section illustrating an apparatus for performing the winding operation in accordance with my new method.

In proceeding with this invention, instead of using the guide members which are shown in my two former patents and which utilize precut lengths of wire for winding, I have provided an arrangement so that the wire which is to be wound may be taken directly from different supply packages or spools. There may be one spool for each two armature grooves or a multiple of such spools for winding two coils at the same time and I have threaded the wire through radially extending openings which are so closed that the end of the wire must be passed through the opening. The guide will have one-half the number of openings that there are grooves in the armature with such an arrangement that the wires which pass through these closed openings may then be extended generally diametrically across the annular guide and there the wires after being pulled from the spool of a sufficient length to provide a complete coil in the armature are laid in grooves open from the top and then these grooves closed. In this manner each wire extends substantially across the center of the guide and is engaged by some sort of a holding device which is mounted upon the armature shaft to which this portion of the wire at the center of the guide is fixed so that as the armature is reciprocated each of the wires will be laid in a groove in the armature, the part on one side of the center forming one coil and the part on the other side of the center leading from the supply source forming another coil. Thus, as the armature is reciprocated and swung through 180° between each reciprocation, the coils will be wound by using up the extent of wire which extends from the center through the top opening groove and will be drawn from the supply spools through the closed openings. After this winding is completed, the wire is severed at the holding device which serves the two parts of wire which form the coils from each other and also forms the supply spool.

With reference to the drawings 10 designates generally an apparatus for winding the armature core. This apparatus consists essentially of a tubular support 11 which has fixedly mounted upon it upstanding supports 12 in the upper end of which there is an annular guide member 13. A shaft 14 is slidably mounted in the bearing 11 and has secured to it a rack 15 engaged by a gear 16 and rotated by hand wheel 17 for reciprocating the shaft 14 vertically. The upper portion of the shaft 18 has a means for mounting the shaft 19 of an armature 20 and which is adjustably held in position by the set screw 21. This armature has a plurality of grooves 22 extending axially thereof into which the armature coils of wire are wound. In the present instance fourteen of such grooves 22 are shown, this being a number which is common in many armatures. However, from the standpoint of this invention, this number may be varied.

At the upper end of the armature shaft 19 there is a wire securing device 23 which consists essentially of a disc with pins 24 extending upwardly therefrom so as to engage and hold the wires which are to be wound so that as the armature is reciprocated up and down, the wires will remain held to this securing device.

At the upper end of these supports 12 there is an annular platform 25 upon which the annular guide 13 is mounted. This guide is shown in greater detail in FIG. 4 and as there seen there is an annulus 26 and an upper annulus in two parts or halves, one part being designated 27 and the other part designated 28. The complete lower annulus 26 and the half of the upper annulus 27 are fixed together and in effect comprise a single unit, although for convenience of manufacture, they are formed in two parts and bolted together by bolts 29. In this unit 26 and 27 there are provided a plurality of radially extending openings 30, here shown as seven in number for use in winding an armature with fourteen grooves, which extend radially outwardly through the annulus comprising the two parts 26 and 27. The uncovered part of the annulus 26 which may be denoted 26' has a plurality of openings 31 extending radially therethrough which are in the form of slots opening upwardly into the upper surface of the annulus 26. In the upper annulus part 28 there are also provided radial slots 32 which extend radially outwardly part way of the thickness of the half annulus 28 and this part 28 serves as a closure for the slots 31 which open upwardly and when this part 28 is assembled with the parts 26 and 27 the upper annulus will be completed and the slots 32 closed from above and serve to close the upward opening of the slots 31. For alignment a pin 33 is fixed to the part 28 and enters the bore 34 in the annulus 26 which serves to align the slots 32 with the slots 31 in the desired position.

A creel designated generally 35 comprises any supporting device 36 upon which there may be rotatably mounted a plurality of spools of wire 37. In this case I have illustrated fourteen of such spools each mounted on a pin 44 as the illustration is to show two wires wound together to provide two coils in each of the slots. However, it will be apparent that half this number of wires may be utilized where a single coil is to be wound at one time in the slots provided or for that matter there might be more than two wires in each slot wound together at one time to provide several coils. The creel 35 is shown for convenience in the shape of an arc although this is immaterial as the spools may be mounted at any location from which the wires may be drawn directly to the guide device 13. This creel is supported by means of arms 38, 39 and 40 from the table 25.

With this apparatus, I can draw wires such as shown at 41 and 42 from two different spools threading them together through one of the radial openings 30a and then pulling these wires substantially diametrically across the center of the annular guide and pulling a suffiicent length from the spool beyond the center of the guide so that a coil may be completely wound on the armature therefrom and then drop these two wires so pulled from the supply into one of the slots such as 31a. Similarly, two wires may be drawn from another pair of spools threading them through another opening 30 and dropping them into another opening 31 and so on until each of the openings 30 and 31 are completely filled with pairs of wires drawn from the spools 37. The wires are drawn across the center of the guide. When the part 23 carrying the pins 24 is raised, it engages these wires and the wires do not slip thereon. Should I find that slipping did occur, I would secure the wire to the pins such as by taking a turn with the wire about a pin so that the wire will be fixed thereto, but this does not appear to be necessary. With the apparatus thus loaded and the armature in the position shown in FIG. 1, the armature may be moved upwardly and as the guide openings 30, 31 are aligned with the grooves 22, the pairs of wires in each of these openings will be laid in the grooves 22 from the upper end downwardly as the armature is raised. When the armature has been fully raised to locate the pairs of wires in the grooves 22 such as indicated in FIG. 3, then the armature is swung through substantially 180° by the rotation of the shaft 14 in its bearing 11. This will draw each of the pairs of wires across the bottom 45 of the armature and align substantially diametrically opposite grooves now designated as 22a in a position aligned with the corresponding grooves 30, 31 whereupon as the armature is then moved downwardly into its original position as shown in FIG. 1, the pairs of wires will be inserted in each of the grooves 22a. The shaft 14 will then be reversed through 180° to its starting point where the original groove 22 will be aligned with its corresponding opening 30a and the process will be repeated until the desired length of coil has been wound in each of the grooves 22.

At this point, that is after the wires are completely wound in the grooves, severing of the wires takes place but not before. The severing then is at the location of the holding device 23 which will sever the part of the wire 50 from the part of the wire that extends to the spool 37 and at the same time severs the connection to the spool. Such severing leaves the wires as at 52 still threaded in the openings 30. Thus it is merely necessary to put a fresh armature in place to be wound, lift guide part 28 from covering position, pull the wires 52 again to a length sufficient to form one of the wound coils in the armature core, lay the wires in the grooves 31 and return the cap or closure 28 and wind the next armature.

A feature of this arrangement is that the wires remain threaded in their openings in the guide making unnecessary the threading of the wires through the openings at each successive armature winding operation. It also makes unnecessary the severing of the wire in the length of the coil desired and thus performs a saving of wire in the operation as only the length of wire necessary per coil from the spool is utilized.

I claim:

1. The method of winding coils in the grooves of an armature core of an electric generator and the like comprising the steps of positioning a length of wire unsevered from a supply spool through a pair of diametically opposed guide slots to align with each of two diametrically spaced grooves in the armature core with said spool rotatably mounted and adjacent one of said guide slots, engaging the wire with some part fixed to the armature shaft at such a location along the wire as to provide from the shaft to the free end of the wire enough length to wind a coil about the core, moving the armature axially past said guide slots and maintaining alignment of the armature grooves and the guide slots so that the wire passes into said diametrically located grooves, rotating the armature core about its axis to a second position whereby the said guide slots are aligned with another set of grooves, moving the armature axially in the opposite direction to the rest position whereby wire is inserted in said other grooves, reversely rotating the armature core about its axis to the first position, thence similarly continuing the winding of the wire parts into their respective grooves so as to simultaneously complete the winding of two coils on the core.

2. The method of claim 1 and thereafter severing the two wire parts at the location of their engagement with the shaft from each other and from the supply spool.

3. The method of claim 1 wherein a plurality of wires unsevered from the supply spool are aligned with each of two grooves in the armature core.

References Cited in the file of this patent

UNITED STATES PATENTS

| | | |
|---|---|---|
| 2,381,750 | Hunsdorf | Aug. 7, 1945 |
| 2,561,562 | Collins | July 24, 1951 |
| 2,632,603 | Hunsdorf | Mar. 24, 1953 |
| 2,875,508 | Farmer | Mar. 3, 1959 |
| 2,876,449 | Farmer | Mar. 3, 1959 |
| 2,964,253 | Gogliardi | Dec. 13, 1960 |